April 27, 1937. C. B. ROEDE Re. 20,343

RAIL FLAW DETECTOR MECHANISM

Original Filed April 27, 1932 2 Sheets-Sheet 1

INVENTOR

Charles B. Roede

BY Joseph H. Lipschutz

ATTORNEY

April 27, 1937. C. B. ROEDE Re. 20,343

RAIL FLAW DETECTOR MECHANISM

Original Filed April 27, 1932 2 Sheets-Sheet 2

INVENTOR
Charles B. Roede
BY
Joseph N. Lipschitz
ATTORNEY

Reissued Apr. 27, 1937

Re. 20,343

UNITED STATES PATENT OFFICE 20,343

RAIL FLAW DETECTOR MECHANISM

Charles B. Roede, Ridgefield, N. J., assignor to Sperry Products, Inc., Brooklyn, N. Y., a corporation of New York Original No. 2,036,829, dated April 7, 1936, Serial No. 607,728, April 27, 1932. Application for reissue February 18, 1937, Serial No. 126,527

18 Claims. (Cl. 175—183)

This invention relates to rail flaw detector apparatus of the type employed on the well-known Sperry rail flaw detector cars. In these cars the detector equipment comprises a source of current within the car, which is supplied to the rail by means of brushes to send the current through the rail and establish an electromagnetic field surrounding the same. Any variations in this field caused by the presence of internal fissures are picked up during the movement of the car by means of induction coils which are maintained a constant distance above the rail surface so that normally they cut a constant number of lines of force, but on encountering the region of a flaw they will cut a different number of lines of force. The coils are connected in opposition so that variations in current supply will not have any effect on the output of said coils, while the presence of a flaw will cause one coil to cut more lines of force than the other and hence generate a differential E. M. F.

It has been found desirable to employ more than two coils for the reasons set forth in the patent to Harcourt C. Drake, No. 1,960,968, granted May 29th, 1934 for Flaw detector unit. The chief advantage of such an arrangement is that it avoids the condition which arises when one coil is symmetrically located with respect to the railhead. In such position a coil is apt to miss a centrally located fissure because such a fissure causes increase and diminution of flux at the sides, and the coil adds up the increase and diminution to yield the same total flux as in a sound part of the rail. In said patent there is disclosed the use of two pairs of coils in staggered relation whereby the defect just described is avoided because each coil coacts with only one side of the railhead and therefore does not sum up the total of increase and diminution of flux. I have found that it is possible to obtain the same result now obtained by the use of two pairs of coils by utilizing only three coils suitably connected and positioned.

It is a further object of my invention to provide a detector unit which will consist of a plurality of sets of detector coils, each set comprising three coils.

It is a further object of my invention to provide a detector unit comprising an odd number of coils more than one in number, that is, three, five, or any greater number.

It is a further object of my invention to provide a detector unit which will comprise several sets of detector coils, each set consisting of an odd number of coils greater than one.

In the coils as heretofore employed, there was utilized a core substantially U-shaped, the arms of said U extending downwardly into close proximity of the rail. I have found that it is desirable that the inner arm of said U be shortened or entirely eliminated since thereby fewer false indications were caused.

Still further objects and advantages of this invention will become apparent in the following detailed description thereof.

In the accompanying drawings,

Fig. 1 is a side elevation of a portion of a Sperry rail flaw detector car showing the detector mechanism suspended therefrom.

Figs. 2–7, inclusive, are plan views, largely diagrammatic, showing the various coil arrangements of the detector unit.

Figs. 10–14, inclusive, are wiring diagrams showing various methods of electrically connecting the coils disclosed in Figs. 2–7 inclusive.

Figure 1:
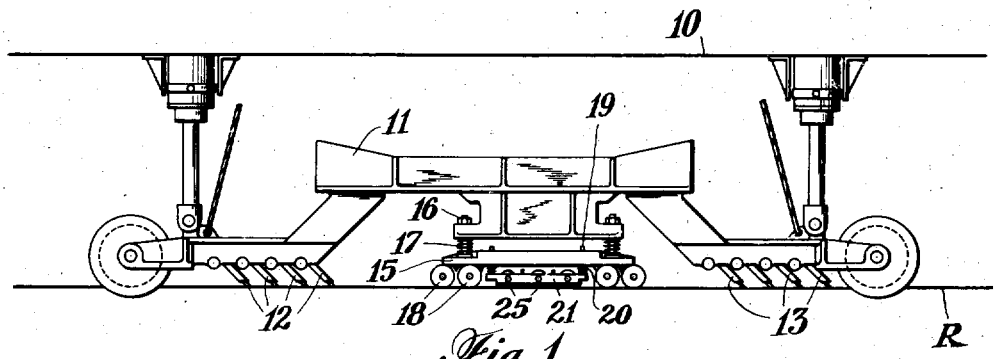

Referring to Fig. 1, there is disclosed a detector mechanism such as is employed on the Sperry detector car. A portion of the car body 10 is shown having suspended therefrom the current brush carriage 11 whose front and rear sets of brushes 12 and 13 are designed to lead current into and out of the rail R, the said current being supplied from a source of current (not shown) within the car. The current brush carriage supports in turn the searching unit or detector carriage 15 by means such as bolts and springs 16, 17. Said carriage may ride along the rail on any suitable means, such as rollers 18, and supports thereon, by any suitable means, such as bolts 19 and springs 20, the searching unit 21 which may consist of a plurality of induction coils designed to cut the lines of force of the electromagnetic field surrounding the rail R. The said coils normally cut a uniform number of lines of force and induce a constant E. M. F., but upon entering the region of a flaw said coils cut a different number of lines of force to induce a different E. M. F. Heretofore, these coils have been employed in pairs, the coils of each pair being opposed so that only the differential E. M. F. generated by said pair of coils resulted when a flaw was encountered. Said E. M. F. after being suitably amplified, was caused to operate any suitable indicating means such as a recorder.

Figure 2:
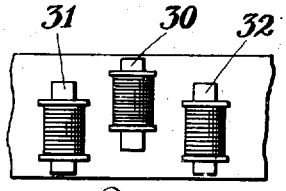

In the patent to Harcourt C. Drake, No. 1,960,-968, there is disclosed the idea of employing a plurality of pairs of detector coils, the coils of each pair being opposed. Thus, four, or any even number of coils, could be employed either in staggered relation as shown in said application or in line. In this invention I have disclosed a method by which I can obtain by the use of three coils the same results as are obtained by said patent by the use of two pairs of coils. For this purpose I may employ the arrangement shown, for example, in Figs. 1 and 2. In Fig. 1 the coils are shown enclosed in cylinders 25 mounted within the search unit 21. Said coils may be arranged as shown in Fig. 2. Here it will be seen that one coil 30 is displaced with respect to two other coils, 31 and 32. By suitably inter-connecting said three coils I have disclosed how the same effect is obtained as in the case of two pairs of coils in staggered relation. Thus, referring to Fig. 14, it will be seen that coils 30 and 31 act as one pair of coils and 30 and 32 act as another pair. The unit as a whole is balanced so that for a variation which affects all three coils, such as a variation in the current supply, there will be no output, that is, no differential E. M. F., because the output of coils 31 and 32 is equal and opposed to that of coil 30. This may be accomplished either by providing half the number of windings on each coil 31 and 32 as are employed on coil 30 or else by varying the air gap between the coils and the rail surface, or by any combination of variations in air gap or in windings so that the sum total of the output of said coils when all are caused to respond simultaneously to the same changing electromagnetic field will be zero. On entering the region of a flaw, it will be seen that coil 31, for example will first cut a different number of lines of force so as to unbalance said unit and then each of the remaining coils 30 and 32 on passing through a region of flaw will also unbalance the unit, so that three separate indications, each comprising a positive and negative impulse, will be obtained. The coils are so positioned that these impulses are additive, especially since said impulses may first be rectified as disclosed in the patent to Harcourt C. Drake, No. 1,955,953, granted April 24, 1934.

Figure 10:
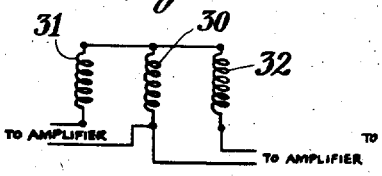
Figure 11:
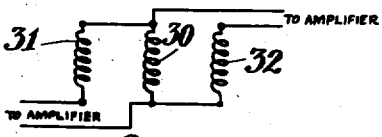

In Figs. 10–13, inclusive, I have shown still other methods of interconnecting the set of three coils so that the equivalent of two pairs of opposed coils is obtained. In these forms, all of the coils are the same, that is, they have the same number of turns. In Fig. 10, for instance, coil 31 is equal to and opposed to coil 30. Said two coils act as a pair. Similarly, coils 30 and 32 are equal and opposed and act as a pair. In other words, I have in effect provided two pairs of coils but I have utilized one common coil in each pair. In Fig. 11, a slightly modified arrangement gives the output between coils 30 and 31 equal and opposite to the output between coils 30 and 32. Thus, while the pair of coils 30 and 31 may give an impulse first positive and then negative, the output between coils 30 and 32 would give an impulse first negative and then positive.

Figure 3:
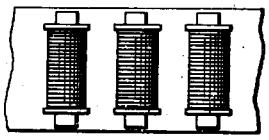
Figure 12:
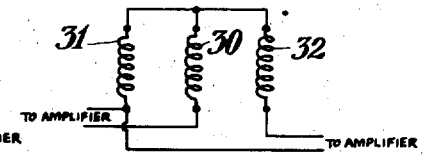
Figure 14:
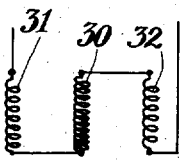
Figure 13:
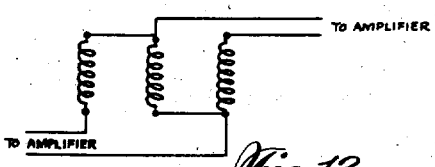

In Fig. 12 I have shown still another form of wiring wherein coils 31 and 30 form one pair, while 31 and 32 form the other pair. In Fig. 13, the form of wiring shown in Fig. 12 has been modified to give the opposite phases in the same manner as in Fig. 11. The three coils may be arranged as shown in Fig. 2 with one coil staggered laterally across the rail with respect to the other two coils, or they may be arranged in line as shown in Fig. 3.

Figure 4:
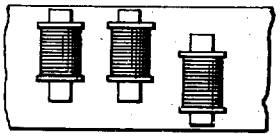

A somewhat different arrangement is disclosed in Fig. 4 wherein the end coil is offset laterally with respect to the other two coils instead of the middle coil being offset as disclosed in Fig. 2.

Figure 5:
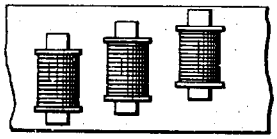

In Fig. 5 is shown still another arrangement of the set of coils wherein said coils are progressively offset laterally so that each coil coacts with a different portion of the rail surface as the car moves along the rail.

If desired, two sets of coils, each set comprising three coils, may be employed and said coils may be arranged in any of the arrangements disclosed in Figs. 2–5 inclusive. Thus, in Fig. 6 I have shown two sets of coils, each set arranged as shown in Fig. 2.

It will be understood that the coils of each set are so positioned that when suitably rectified the impulses from the various coils are additive. Also, when several sets of coils are employed as in Fig. 6, not only are the impulses of the coils within each set additive, but the sets are so positioned that the impulses from one set are added to the impulses from the other set. In this manner a protracted impulse is obtained which is capable of actuating indicating mechanism without danger of a flaw being missed.

Figure 7:
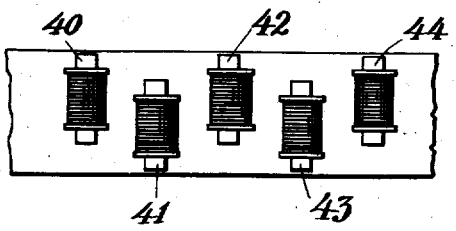

While I have described an arrangement of three coils above, the same principle may apply to any odd number of coils, as, for example, five coils, as shown in Fig. 7, which would ordinarily do the work which heretofore required at least four pairs of opposed coils. A material reduction in the number of coils and in the space required for such a unit is therefore obtained. Thus, coils 40 and 41 is one pair, 41 and 42 a second pair, 42 and 43 a third pair, and 43 and 44 a fourth pair.

Figure 6:
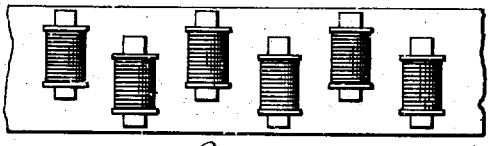

In Fig. 6 form I do not limit myself to two sets of coils where each set comprises but three coils, since each set may consist of any odd number of coils, three or more.

Figure 8:
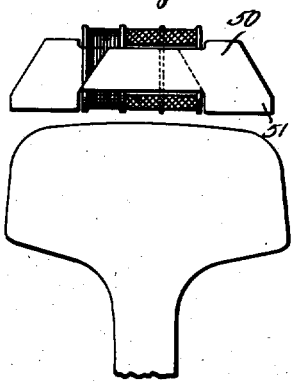
Fig. 8 is a vertical section through a detector unit showing my improved core for the induction coil.
Figure 9:
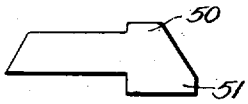
Fig. 9 is an end elevation of the core shown in Fig. 8.

In Fig. 8, where the coils are shown offset so that the inner end of the core 50 would coact with a portion of the railhead nearer the center thereof than the outer end, it was found desirable to cut off the inner arm, to increase the reluctance of the magnetic circuit which includes the core and the railhead and thereby eliminate indications due to surface irregularities and to surface burns. The core, therefore, appears as shown in Figs. 8 and 9 with only the outer end thereof provided with arm 51 extending downwardly substantially to the lowermost edge of the coil.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a device for detecting flaws in rails, a detector unit, said unit comprising an induction coil having a core extending therethrough, only one end of said core having an arm extending downwardly adjacent the rail surface.

2. In a device for detecting flaws in rails, a detector unit, said unit comprising an induction coil having a core extending therethrough, one end of said coil and said core being positioned nearer the center of the rail than the other end, only the latter end of said core being provided with an arm extending downwardly adjacent the rail surface.

3. In a device for detecting flaws in electrical conductors, said device having means for passing current through the conductor to establish an electromagnetic field, a detector unit, said unit comprising three coils conductively connected and in inductive relation to said conductor, each of said coils comprising a plurality of substantially parallel turns, each coil being positioned with its axis substantially at right angles to the direction of current flow through the conductor.

4. In a device for detecting flaws in electrical conductors, said device having means for passing current through the conductor to establish an electromagnetic field, a detector unit, said unit comprising three coils conductively connected in balanced relation and in inductive relation to said conductor, each of said coils comprising a plurality of substantially parallel turns, each coil being positioned with its axis substantially at right angles to the direction of current flow through the conductor.

5. In a device for detecting flaws in electrical conductors, said device having means for passing current through the conductor to establish an electromagnetic field, a detector unit, said unit comprising an odd number of coils more than one, conductively connected and in inductive relation to said conductor, each of said coils comprising a plurality of substantially parallel turns, each coil being positioned with its axis substantially at right angles to the direction of current flow through the conductor.

6. In a device for detecting flaws in electrical conductors, said device having means for passing current through the conductor to establish an electromagnetic field, a detector unit, said unit comprising an odd number of coils more than one, conductively connected in balanced relation and in inductive relation to said conductor, each of said coils comprising a plurality of substantially parallel turns, each coil being positioned with its axis substantially at right angles to the direction of current flow through the conductor.

7. In a device for detecting flaws in electrical conductors, said device having means for passing current through the conductor to establish an electromagnetic field, a detector unit, said unit comprising three coils conductively connected and in inductive relation to said conductor, each of said coils comprising a plurality of substantially parallel turns, each coil being positioned with its axis substantially at right angles to the direction of current flow through the conductor, one of said coils being balanced against the other two coils.

8. In a device for detecting flaws in electrical conductors, said device having means for passing current through the conductor to establish an electromagnetic field, a detector unit, said unit comprising three coils conductively connected and in inductive relation to said conductor, each of said coils comprising a plurality of substantially parallel turns, each coil being positioned with its axis substantially at right angles to the direction of current flow through the conductor, one of said coils coacting with each of the other coils.

9. In a device for detecting flaws in electrical conductors, said device having means for passing current through the conductor to establish an electromagnetic field, a detector unit, said unit comprising an odd number of coils conductively connected and in inductive relation to said conductor, each of said coils comprising a plurality of substantially parallel turns, each coil being positioned with its axis substantially at right angles to the direction of current flow through the conductor, certain of said coils each coacting with a plurality of the other coils.

10. In a device for detecting flaws in electrical conductors, said device having means for passing current through the conductor to establish an electromagnetic field, a detector unit, said unit comprising a plurality of sets of coils, each set comprising three coils conductively connected and in inductive relation to said conductor, each of said coils comprising a plurality of substantially parallel turns, each coil being positioned with its axis substantially at right angles to the direction of current flow through the conductor.

11. In a device for detecting flaws in electrical conductors, said device having means for passing current through the conductor to establish an electromagnetic field, a detector unit, said unit comprising a plurality of sets of coils, each set comprising three coils conductively connected in balanced relation and in inductive relation to said conductor, each of said coils comprising a plurality of substantially parallel turns, each coil being positioned with its axis substantially at right angles to the direction of current flow through the conductor.

12. In a device for detecting flaws in electrical conductors, said device having means for passing current through the conductor to establish an electromagnetic field, a detector unit, said unit comprising a plurality of sets of coils, each set comprising an odd number of coils conductively connected and in inductive relation to said conductor, each of said coils comprising a plurality of substantially parallel turns, each coil being positioned with its axis substantially at right angles to the direction of current flow through the conductor.

13. In a device for detecting flaws in electrical conductors, said device having means for passing current through the conductor to establish an electromagnetic field, a detector unit, said unit comprising a plurality of sets of coils, each set comprising an odd number of coils conductively connected in balanced relation and inductive relation to said conductor, each of said coils comprising a plurality of substantially parallel turns, each coil being positioned with its axis substantially at right angles to the direction of current flow through the conductor.

14. In a device for detecting flaws in rails, said device having means for passing current through the rail to establish an electromagnetic field, a detector unit, said unit comprising three coils conductively connected and in inductive relation to the rail, each of said coils comprising a plurality of substantially parallel turns, each coil being positioned with its axis substantially at right angles to the direction of current flow through the conductor, one of said coils being displaced with respect to the remaining coils laterally of the rail.

15. In a device for detecting flaws in rails, said device having means for passing current through the rail to establish an electromagnetic field, a detector unit, said unit comprising an odd number of coils conductively connected and in inductive relation to the rail, each of said coils comprising a plurality of substantially parallel turns, each coil being positioned with its axis substantially at right angles to the direction of current flow through the conductor, certain of said coils being displaced with respect to the remaining coils laterally of the rail.

16. The method of reducing false indications in a rail fissure detector system which consists in passing current through the rail to establish an electromagnetic field surrounding the rail, exploring said field by an induction coil positioned so as to establish a magnetic circuit which includes the core of said coil and the railhead, and increasing the reluctance of said circuit above that of a circuit wherein the induction coil has a U-shaped core with arms extending toward the rail substantially to the lowermost edge of the coil.

17. In a rail fissure detector mechanism having means for passing current through the rail to establish an electromagnetic field surrounding the same, an induction coil having a core for exploring said field and positioned so as to establish a magnetic circuit which includes said core and the railhead, said core being so formed as to increase the reluctance of said circuit above that of a circuit wherein the induction coil has a U-shaped core with arms extending toward the rail substantially to the lowermost edge of the coil.

18. In a rail fissure detector system, the method which consists in passing current through the rail to establish an electromagnetic field surrounding the rail, exploring said field by an induction coil positioned so as to establish a magnetic circuit which includes the coil of said core and the railhead, and reducing false indications in said system by increasing the reluctance of said circuit.

CHARLES B. ROEDE.